United States Patent
Miller et al.

(10) Patent No.: US 6,909,518 B2
(45) Date of Patent: Jun. 21, 2005

(54) SYSTEM AND METHOD FOR CONFIGURING A PRINTING SYSTEM

(75) Inventors: David J Miller, Camas, WA (US); Jeremy Bunn, Kelso, WA (US); Karen E. Misustin, West Linn, OR (US); Daniel Revel, Portland, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 893 days.

(21) Appl. No.: 09/884,598

(22) Filed: Jun. 18, 2001

(65) Prior Publication Data

US 2002/0191211 A1 Dec. 19, 2002

(51) Int. Cl.[7] ............................................. G06K 15/00
(52) U.S. Cl. ..................................... 358/1.13; 358/1.15
(58) Field of Search .............................. 358/1.1, 1.13, 358/1.15, 402, 403, 407

(56) References Cited

U.S. PATENT DOCUMENTS

| | | | |
|---|---|---|---|
| 5,283,887 A | 2/1994 | Zachery | 395/500 |
| 5,406,557 A | 4/1995 | Baudoin | 370/61 |
| 5,418,908 A | 5/1995 | Keller et al. | 395/200 |
| 5,436,960 A | 7/1995 | Campana, Jr. et al. | 379/58 |
| 5,781,901 A | 7/1998 | Kuzma | 707/10 |
| 5,832,191 A | 11/1998 | Thorne | |
| 5,838,252 A | 11/1998 | Kikinis | 340/825.44 |
| 5,844,969 A | 12/1998 | Goldman et al. | 379/93.24 |
| 5,903,723 A | 5/1999 | Beck et al. | 395/200.3 |
| 5,905,777 A | 5/1999 | Foladare et al. | 379/90.01 |
| 5,937,162 A | 8/1999 | Funk et al. | 395/200.36 |
| 5,958,006 A | 9/1999 | Eggleston et al. | 709/219 |
| 5,964,833 A | 10/1999 | Kikinis | 709/206 |
| 5,974,449 A | 10/1999 | Chang et al. | 709/206 |
| 5,978,837 A | 11/1999 | Foladare et al. | 709/207 |
| 5,995,597 A | 11/1999 | Woltz et al. | 379/93.24 |
| 6,023,700 A | 2/2000 | Owens et al. | 707/10 |
| 6,035,104 A | 3/2000 | Zahariev | 395/200.33 |
| 6,073,165 A | 6/2000 | Narasimhan et al. | 709/206 |
| 6,160,631 A | 12/2000 | Okimoto et al. | 358/1.15 |
| 6,182,059 B1 | 1/2001 | Angotti et al. | 706/45 |
| 6,219,694 B1 | 4/2001 | Lazaridis et al. | 709/206 |
| 6,256,666 B1 | 7/2001 | Singhal | 709/217 |
| 6,275,848 B1 | 8/2001 | Arnold | 709/206 |
| 6,360,252 B1 | 3/2002 | Rudy et al. | 709/206 |
| 6,785,015 B1 * | 8/2004 | Smith et al. | 358/1.15 |

FOREIGN PATENT DOCUMENTS

| | | |
|---|---|---|
| EP | 0665486 A3 | 8/1995 |
| EP | 0772327 A2 | 5/1997 |
| EP | 0855821 A1 | 7/1998 |
| EP | 0950969 A2 | 10/1999 |

OTHER PUBLICATIONS

Jeff M. Anderson et al., United States Patent Application entitled "Rendering Broker Service and Method," U.S. Appl. No. 09/884,593; filed Jun. 18, 2001 (Related Application).

(Continued)

*Primary Examiner*—Arthur G. Evans

(57) ABSTRACT

A system, method, and program embodied on a computer readable medium are provided for configuring the automated print agent for printing. In one embodiment, the method comprises receiving an email print message addressed to a network alias, the network alias being associated with an automated print agent employed for performing an email print, identifying a printer specified in the email print message, determining if the automated print agent is configured for printing to the printer, and, automatically configuring the automated print agent to print to the printer upon a determination that the automated print agent is not configured to print to the printer.

25 Claims, 3 Drawing Sheets

OTHER PUBLICATIONS

Jeff M. Anderson et al., United States Patent Application entitled "System and Method for Remote Document Retrieval," U.S. Appl. No. 09/884,600; filed Jun. 18, 2001 (Related Application).

Lainye Reich et al., United States Patent Application entitled "System and Method for Automated Rendering to Print to a File," U.S. Appl. No. 09/884,249; filed Jun. 18, 2001 (Related Application).

Jeff M. Anderson et al., United States Patent Application entitled "System and Method for Mobile Printing," U.S. Appl. No. 09/974,390; filed Oct. 10, 2001 (Related Application).

David J. Miller et al., United States Patent Application entitled "System and Method for Mobile Printing," U.S. Appl. No. 09/884,594; filed Jun. 18, 2001 (Related Application).

Jeff M. Anderson et al., United States Patent Application entitled "System and Method for Walk–Up Printing," U.S. Appl. No. 09/884,318; filed Jun. 18, 2001 (Related Application).

Dana E. Laursen et al., United States Patent Application entitled "Document Delivery System for Automatically Printing a Document on a Printing Device," U.S. Appl. No. 09/855,230; filed May 14, 2001 (Related Application).

Keith M. Taylor et al., United States Patent Application entitled "Limited Printing of Electronically Transmitted Information," U.S. Appl. No. 09/546,059; filed Apr. 10, 2000 (Related Application).

Pieter J. van Zee et al., United States Patent Application entitled "Validation and Audit of E–Media Delivery," U.S. Appl. No. 09/694,542; filed Oct. 23, 2000 (Related Application).

Jon A. Brewster et al., United States Patent Application entitled "Document Delivery System for Automatically Printing a Document on a Printing Device," U.S. Appl. No. 09/325,040; filed Jun. 7, 1999 (Related Application).

Aloke Gupta et al., United States Patent Application entitled "Document Delivery System for Automatically Printing a Document on a Printing Device," U.S. Appl. No. 09/495,013; filed Jan. 31, 2000 (Related Application).

PCT Application, WO 01/22259; Sinia Corporation; "Transferring E–mail Attachments to Devices for Rendering"; Mar. 29, 2001.

Hewlett–Packard Company patent application. U.S. Appl. No. 09/745,711. filed Dec. 18, 2000. System And Method For Printing A Document For A Network User.

Hewlett–Packard Company patent application. U.S. Appl. No. 09/697,990. filed Oct. 27, 2000. Method And System For Printing From An IP Network.

Hewlett–Packard Company patent application. U.S. Appl. No. 09/662,372. filed Sep. 13, 2000. Method And Apparatus For Printing Via A Wireless Communication Device.

Hewlett–Packard Company patent application. U.S. Appl. No. 09/814,284. filed Mar. 21, 2001. Mailbox Printing Services For Information Appliances.

Hewlett–Packard Company patent application. U.S. Appl. No. 09/799,381. filed Mar. 6, 2001. System And Method For Distributed Processing.

Hewlett–Packard Company patent application. U.S. Appl. No. 09/804,607. filed Mar. 12, 2001. Mobile Remote Printing Systems.

Hewlett–Packard Company patent application. U.S. Appl. No. 09/712,337. filed Nov. 13, 2000. System And Method For Printing To A Printer Without The Use Of A Print Driver.

* cited by examiner

SYSTEM AND METHOD FOR CONFIGURING A PRINTING SYSTEM

TECHNICAL FIELD

The present invention is generally related to the field of printing and, more particularly, is related to a system and method for configuring a printing system for printing using electronic mail to print to a printer.

BACKGROUND OF THE INVENTION

Recent years have seen a proliferation of portable electronic devices such as personal digital assistants (PDA's), cellular telephones, and/or other portable electronic devices. For example, personal digital assistants are now available such as the HP Jornada manufactured by Hewlett-Packard Company based in Palo Alto, Calif., or the Blackberry™ manufactured by Research in Motion™ Limited based in Ontario, Canada as well as other brands. These mobile devices offer a range of capabilities, including mobile calendars, organizing capabilities, and electronic mail received and transmitted via a mobile pager network or other mobile networks, etc.

Unfortunately, these devices are typically limited in their capabilities due to the fact that they are limited in their processing capacity and memory size. For example, many such devices cannot execute the many different applications that are available for the average personal computer. Specifically, such devices may not be able to implement word processors or other extensive applications.

When it comes to activities such as printing, etc., such devices typically are unable to perform various tasks such as rendering documents in printer compatible form, etc. This fact can severely impact the usefulness of such devices. For example, a user may find themselves in the situation where they are standing in front of a printer with their personal digital assistant in hand and a document stored thereon that they wish to print. Unfortunately, in such a circumstance, the user may be prevented from printing a document with the printer due to the limited capability of the personal digital assistant.

In another situation, a user may find themselves visiting customers outside of their normal office where their own personal computer or company network reside. At such time, there may be a document that the user wishes to print out for his or her customers that is stored in a server or on the personal computer back at their office. Today's personal digital assistants lack the capability to interact with the network back at the office in order to obtain the document in electronic form. Also, assuming the user obtains the document, they are still faced with the difficulty of printing it out.

In yet another situation, a user may have a laptop computer that has the computing capacity to perform the tasks necessary to print a document. However, the user may be in a location where they do not have access to their usual printer. In such a case, the user may be prevented from printing to any available printer because it is a different model that requires a rendering service or driver that is not stored on their laptop.

SUMMARY OF THE INVENTION

In view of the foregoing, one potential printing solution for personal digital assistants is to employ electronic mail ("email") or equivalent system as a transport mechanism between a personal digital assistant and an automated print agent that facilitates email printing. In this respect, an email and any attached documents that are received by the automated print agent are printed on a designated printer specified in the email. However, in some cases, a particular printer may not be configured in the email printing system.

To remedy such a situation, the present invention provides for a system, method, and program embodied on a computer readable medium for configuring the automated print agent for printing. In one embodiment, a printer configuration method is provided that comprises receiving an email print message addressed to a network alias, the network alias being associated with an automated print agent employed for performing an email print, identifying a printer specified in the email print message, determining if the automated print agent is configured for printing to the printer, and, automatically configuring the automated print agent to print to the printer upon a determination that the automated print agent is not configured to print to the printer.

According to another embodiment, the present invention provides for a program embodied in a computer readable medium for printer configuration. In this regard, the program comprises code that identifies a printer designated in an email print message addressed to a network alias, the network alias being associated with an automated print agent employed for performing an email print, code that determines if the automated print agent is configured for printing to the printer, and, code that automatically configures the automated print agent to print to the printer upon a determination that the automated print agent is not configured to print to the printer.

A system for printer configuration, comprising means for identifying a printer designated in an email print message addressed to a network alias, the network alias being associated with an automated print agent employed for performing an email print, means for determining if the automated print agent is configured for printing to the printer, and, means for automatically configuring the automated print agent to print to the printer upon a determination that the automated print agent is not configured to print to the printer.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
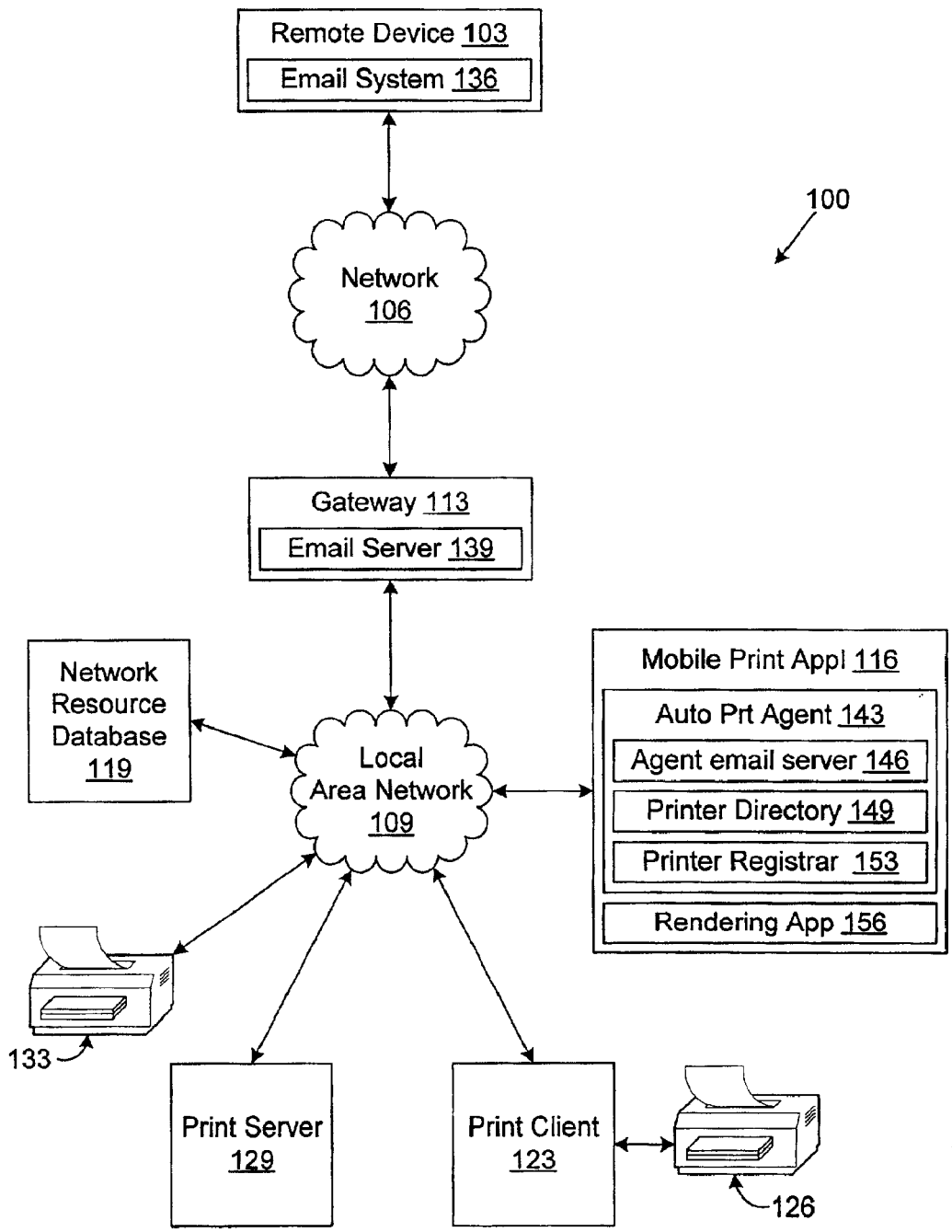
FIG. 1 is a block diagram of a remote print network according to an aspect of the present invention.

With reference to FIG. 1, shown is a remote print network 100 according to an aspect of the present invention. The remote print network 100 includes a remote device 103 that is coupled to a network 106. The remote print network 100 also includes a local area network 109 that is coupled to the network 106 via a gateway 113. In this respect, the network 106 may be, for example, the Internet, wide area networks (WANs), local area networks, wireless networks, or other suitable networks, etc., or any combination of two or more such networks Although the network 106 is shown as separate from the local area network 109 and linked thereto by the gateway 113, it is understood and can be appreciated by those with ordinary skill in the art that both networks may be viewed as a single network, such depiction shown in FIG. 1 being employed to facilitate the discussion of the present invention. For example, in some situations, the remote device 103 may link either wirelessly or in some other manner directly to the local area network 109, thereby bypassing the gateway 113. In other situations, the local area network 109 may not be employed for organizations with distributed offices, etc., that employ the Internet or other network.

The remote print network 100 also includes the mobile print appliance 116, a network resource database 119, and a print client 123 with an attached local printer 126. In addition, the remote print network 100 may further comprise a print server 129 and a network printer 133 associated therewith, both the print server 129 and the network printer 133 being coupled to the local area network 109. The network resource database 119 may be maintained within a computer system that is coupled to the local area network 109. Likewise, the print server 129, print client 123, mobile print appliance 116, and the gateway 113 may all comprise a computer systems or devices with like capability. Within the remote device 103 is an electronic mail ("email") system 136. As contemplated herein, an email system or email server is a system that facilitates the exchange or text messages and computer files over a communications network such as the local area network 109 or the network 106. In this regard, such systems may employ the Simple Mail Transfer Protocol that is a Transmission Control Protocol/Internet Protocol (TCP/IP) for sending messages from one computer to another on a network. The gateway 113 includes an email server 139. The email system 136 may comprise, for example, one of several commercially available email systems such as Microsoft Outlook created by Microsoft Corporation of Redmond, Washington or equivalent email systems that are generally known by those with ordinary skill in the art.

The mobile print appliance 116 includes an automated print agent 143. The automated print agent 143 is similar in many respects to the automated print agent disclosed in co-pending United States Patent Application entitled "System and Method for Mobile Printing" filed on even date herewith assigned Ser. No. 09/884,593 the entire text and drawings of which are incorporated herein by reference. The automated print agent 143 includes an agent email server 146, a printer directory 149, and a printer registrar 153. The mobile print appliance 116 also includes a rendering application 156 that performs functionality similar in nature to the rendering applications discussed in the above reference U.S. patent application.

The remote print network 100 is employed to facilitate email printing. Specifically, a user of the remote device 103 may manipulate the email system 136 to generate an email print message that is transmitted to the agent email server 146 in the automated print agent 143. In this respect, the email print message that is generated by the email system 136 is addressed using a network alias that is associated with the automated print agent 143. A domain name that is unique to both the network 106 and the local area network 109 is associated with the automated print agent 143, wherein all email messages that are transmitted using the domain name are directed to the agent email server 146. The network alias that is employed to address the email print message in the remote device 103 includes the domain name that is associated with the automated print agent 143. In this manner, the email print message is thus directed to the agent email server 146 of the automated print agent 143.

According to another aspect of the present invention, the email print message generated by a user who manipulates the email system 136 of the remote device 103 includes a printer identifier that is associated with a printer coupled to the local area network 109. In this manner, a user of the remote device 103 identifies the precise printer coupled to the local area network 109 or other network upon which they wish to print a particular document.

Next a general description of the printing of a specific document using the email system 136 in the remote device 103 is provided as an illustration with which to better understand the present invention. In particular, the remote device 103 may be a personal digital assistant or other such device that lacks either the computing power to render and/or print a document stored thereon or lacks the application such as an appropriate driver necessary to perform such tasks. The personal digital assistant may also lack an ability to communicate directly with a printer through either a hardwire connection or wireless connection.

Assume, for example, that a user of the remote device 103 is standing in front of the network printer 133 and wishes to print a document stored within the remote device 103 on the network printer 133. The user then generates the email print message using the email system 136 and attaches any documents thereto for printing. Included within the email print message is the printer name of the network printer 133 on the local area network 109. The printer name may comprise a combination of the name of the print server 129 associated with the network printer 133 and the name of the network printer 133 itself as is generally understood by those with ordinary skill in the art.

The email print message is then transmitted along with any attached documents to the agent email server 146 within the automated print agent 143. A network alias is employed, for example, to address the email print message. The network alias includes the domain name of the agent email server 146 so that the email print message is properly routed through the network 106, the gateway 113, and the local area network 109 to the agent email server 146. Upon receiving the email print message, the agent email server 146 causes the automated print agent 143 to perform such tasks as are necessary to print the document and the email on the network printer 133. In this respect, the automated print agent 143 is defined herein as a system that provides for automated email printing including the printing of an email message and all documents attached thereto given that the email print message is addressed to the automated print agent 143. The specific steps and/or logic employed within the mobile print appliance 116 to accomplish such task is described in greater detail with reference to co-pending United States Patent Application entitled "System and Method For Mobile Printing" filed on even date herewith and assigned Ser. No. 09/884,593. In this respect, the specific functionality of the automated print agent 143 in performing the specific functions necessary to print the attached document on the network printer 133 are not described in detail. Also, it is understood that the mobile print appliance 116 provides one example of an implementation of email printing, where other network configurations in which the automated print agent 143 and related components are located and executed by devices other than the mobile print appliance 116 as described in the above referenced United States Patent Application.

Also, a user may identify the printer 126 attached to the print client 123 to be used to print the attached document rather than the network printer 133. In this respect, the email print message generated by the user of email system 136 may include the name of the print client 123 on the local area network 109 as well as the designation of the printer 126 in order that the automated print agent 143 may know to print the document to the printer 126.

Assuming no errors, in the above scenario, a user is able to print the email print message and any attached documents accordingly. However, it may happen on some occasions that a user of the remote device 103 may wish to print the email print message and attached documents on a particular printer coupled to the local area network 109 or other applicable network, but the automated print agent 143 may not be configured to print to the chosen printer. Such a printer may be directly coupled to the local area network 109 directly such as the network printer 133 or indirectly such as the printer 126 locally attached to the print client 123.

In particular, upon receiving an email print message, the automated print agent 143 then determines which one of the printers coupled to the local area network 109 or other network accessible by the mobile print appliance 116 is to be employed to print the email print message and any attached documents. In making this determination, the automated print agent 143 consults with the printer directory 149 that lists all of the printers and their locations on the local area network 109 or other network to which it may print. Upon finding the printer designated by the email print message in the printer directory 149, the auto print agent 146 then proceeds to perform the functions necessary to print the email print message and attachments on the designated printer. Thus the auto print agent 146 is configured to print to a particular printer 126/133 when such printer 126/133 is listed in the printer directory 149. In this respect, the printer directory 149 provides all necessary information, including, the location on the local area network 109 or other network of any printer driver that is to be employed to render the document into the language native to the respective printer for printing, etc. Among other aspects, the present invention provides the capability of automatically configuring the automated print agent 143 to print to a predefined printer in circumstances where the automated print agent 143 is not configured to print to such printer.

In doing so, the automated print agent 143 executes the printer registrar 153 that performs the specific functions of automatically configuring the automated print agent 143 in such circumstances. The printer registrar 153 then identifies the respective printer from the email print message upon which the email print message and attached documents are to be printed. Once the name of the printer on the local area network 109 or other network is known, the printer registrar 153 then proceeds to determine whether the respective printer actually exists on the local area network 109 or other network. This may be done, for example, by consulting with the network resource database 119 that includes information about the local area network 109 such as a list all of the devices attached thereto.

Assuming that the particular printer exists on the local area network 109 or other network, the printer registrar 153 then registers such printer into the printer directory 149 by writing the various parameters to the printer directory 149 in a memory of the mobile print appliance 116. Thereafter, the automated print agent 143 then initiates all functions necessary to print the document on the respective printer according to its normal mode of operation.

Figure 2:
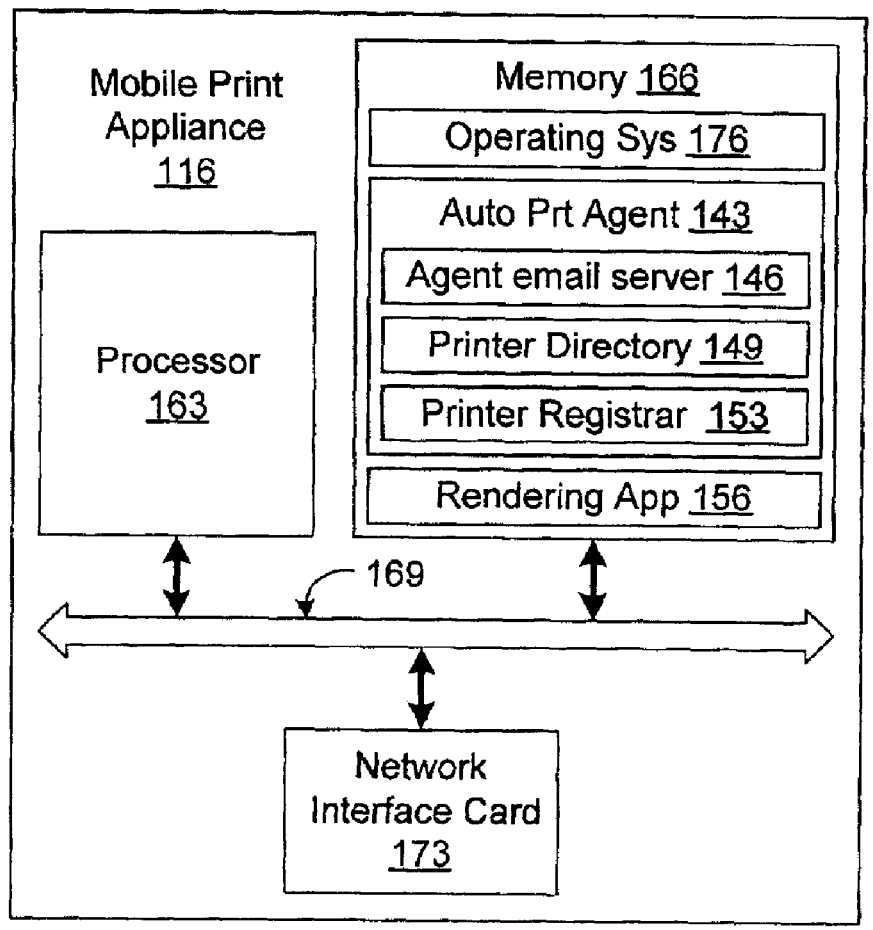
FIG. 2 is a block diagram of a mobile print appliance employed in the remote print network of FIG. 1.

With reference to FIG. 2, shown is an embodiment of the mobile print appliance 116 according to an aspect of the present invention. In this respect the mobile print appliance 116 includes a processor circuit with a processor 163 and a memory 166, both of which are coupled to a local interface 169. The local interface 169 may be, for example, a data bus with an accompanying control/address bus as is generally known by those with ordinary skill in the art. The mobile print appliance 116 also includes, for example, a network interface card 173 that is employed to couple the mobile print appliance 116 to the local area network 109 (FIG. 1). Note that the various other devices coupled to the local area network 109 may employ processor circuits in a similar manner where such devices are computer systems or devices with like capability.

Stored on the memory 166 and executable by the processor 163 are an operating system 176, the automated print agent 143, and the rendering application 156. Within the automated print agent 143 is the agent email server 146, the printer directory 149, and the printer registrar 153. Note that other systems and/or components may be stored on the memory 166 and executable by the processor 163 as can be appreciated by those with ordinary skill in the art. In particular, the mobile print appliance 116 may comprise, for example, a computer system or other device with like capability as can be appreciated by those with ordinary skill in the art.

The operating system 176 is executed, for example, to control the allocation and usage of hardware resources in the mobile print appliance 116. Specifically, the operating system 176 controls the allocation and usage of various portions of the memory 166, processing time, and the peripheral devices as well as performing other functionality. In this manner, the operating system 176 serves as the foundation on which applications depend as is generally known by those with ordinary skill in the art.

The memory 166 may include both volatile and nonvolatile memory components. Volatile components are those that do not retain data values upon loss of power. Nonvolatile components are those that retain data upon a loss of power. Thus, the memory 166 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 163 may represent multiple processors and the memory 166 may represent multiple memories that operate in parallel. In such a case, the local interface 169 may be an appropriate network that facilitates communication between any two of the multiple processors, between any processor and any one of the memories, or between any two of the memories etc. The processor 163 may be, for example, electrical or optical in nature.

Figure 3:
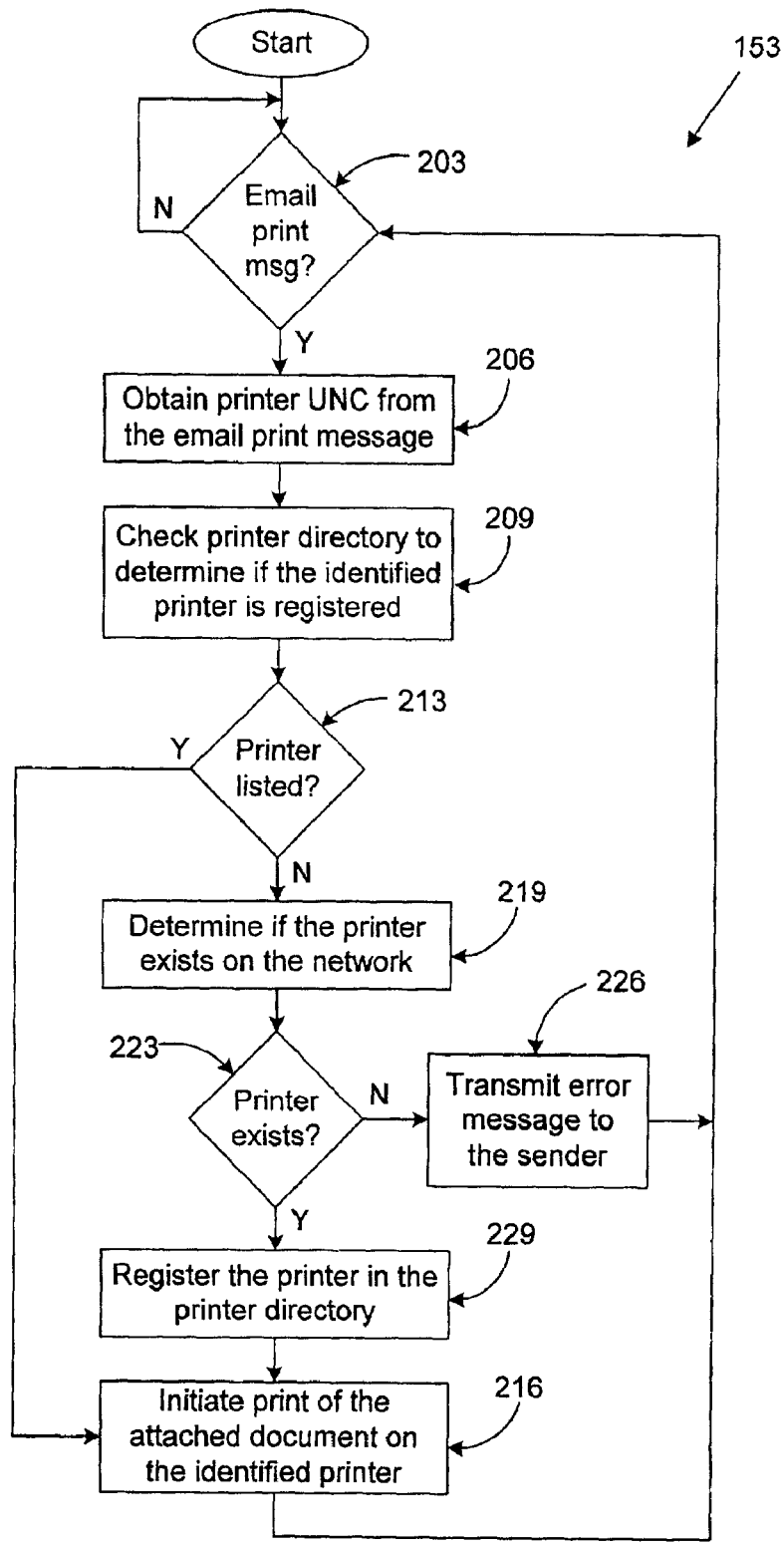
FIG. 3 is a flow chart of a printer registrar executed in the mobile print appliance of FIG. 2.

With reference then to FIG. 3, shown is a flow chart of the printer registrar 153 according to an aspect of the present invention. Alternatively, the flow chart of FIG. 3 may be viewed as depicting steps in a method implemented in the mobile print appliance 116 or other device. The printer registrar 153 is thus employed to configure the automated print agent 143 to print to a printer 126/133 (FIG. 1) for which the automated print agent 143 was not previously configured.

Beginning with box 203, the printer registrar 153 first determines whether an email print message with any attachments has been received from the remote device 103 or other device to be printed. This is determined when the agent email server 146 receives such email print messages. The email print message is addressed to the agent email server 146 by including the domain name in the network alias employed as the address of the agent email server 146.

When such an email print message 203 has been received, the printer registrar 153 then proceeds to box 206 in which a printer network identifier associated with the respective printer to be employed for printing is obtained from the email print message itself. The printer network identifier may be, for example, a uniform naming convention (UNC) identifier or a uniform resource identifier (URI) associated with the respective printer.

The printer network identifier of the printer may be obtained from the network alias that was employed to address the email print message 203. For example, if the domain name associated with the agent email server 146 is employed in the network alias, then the email print message can be directed to the agent email server 146 regardless of the first name portion of the network alias.

To be more specific, assume that a particular printer is identified as "printer1" and that the printer is associated with a print server named "server1." Also, assume that the domain name associated with the automated print agent 143 is "apa.com." Therefore, the network alias might be, for example, "server1.printer1@apa.com". Alternatively, the network alias may be "http://www.corporation.com/printer1@apa.com", thereby identifying the URI of the specific printer, etc. In this respect, the network alias identifies the particular printer to which the email print message 203 is directed based upon the first portion of the network alias. At the same time, the domain name "apa" ensures that regardless of the first portion of the network alias, the email print message is always received by the agent email server 146. However, alternatively, the printer network identifier of the respective printer on the local area network 109 or other network may be included anywhere within the email print message as can be appreciated by those with ordinary skill in the art. In such case, the email print message is generated in light of predetermined protocols so that the printer registrar 153 may recognize which portion of the email print message 203 is in fact the printer network identifier of the respective printer.

Once the printer network identifier of the respective printer to which the email print message is directed is known, then the printer registrar 153 proceeds to box 209 in which it checks the printer directory 149 (FIG. 2) to determine if the identified printer is registered therein. Specifically, once the name of the printer as well as the name of the associated print server 129 (FIG. 1) or print client 123 (FIG. 1) are known, such information may be compared with existing entries in the printer directory 149 to identify a match. If the desired printer is actually listed in the printer directory 149 in box 213, then the printer registrar 153 proceeds to box 216 to initiate a printing of the email print message and any attached documents on the identified printer coupled to the local area network 109 or other network.

On the other hand, if in box 213 the printer is not listed in the printer directory 149, then the printer registrar 153 proceeds to box 219 to determine if the respective printer even exists on the local area network 109 or other network accessible to the printer registrar 153. This may be determined, for example, by interfacing with an appropriate network resource database 119 that keeps track of all devices located on the local area network 109, etc. Such may be the function of appropriate network administrator software such as, for example, network operating systems such as Windows and Unix as can be appreciated by those with ordinary skill in the art.

Note that such an inquiry may be made because the precise name of the printer 126/133 as well as the name of any associated print server 129 (FIG. 1) or print client 123 (FIG. 1) was determined in box 206. Thereafter, in box 223, if the desired printer does not exist on the local area network 109 or other network accessible to the printer registrar 153, the printer registrar 153 proceeds to box 226 to transmit an error message to the sender of the email print message 203 that such printer does not exist and cannot be configured for printing. Specifically, the error message may be generated in the form of a reply email message using the "from" address in the original email print message that is sent back to the originator. Thereafter, the printer registrar 153 reverts back to box 203.

However, if in box 223 the printer does exist on the local area network 109 as it was discovered in the network resource database 119, then the printer registrar 153 proceeds to box 229 to register the printer in the printer directory 149. In registering the printer in the printer directory 153, the printer registrar 153 may include information such as, for example, the name of any associated print server 129 (FIG. 1), the name of any associated print client 123, the name of the respective printer 126/133, the name of the printer driver necessary to communicate with the respective printer 1261133, and any other information that may be employed in printing the email print message and any documents attached thereto. Thereafter, the printer registrar 153 proceeds to box 216 in which the functions within the automated print agent 143 are initiated to actually cause the printing of the document on the identified printer. By virtue of the printer registrar 153, the automated print agent 143 is thus automatically configured to print to printers for which it was previously not configured.

Although the printer registrar 153 of the present invention is embodied in software or code executed by general purpose hardware as discussed above, as an alternative the printer registrar 153 may also be embodied in dedicated hardware or a combination of software/general purpose hardware and dedicated hardware. If embodied in dedicated hardware, the printer registrar 153 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc.

Such technologies are generally well known by those skilled in the art and, consequently, are not described in detail herein.

The flow chart of FIG. 3 shows the architecture, functionality, and operation of an implementation of the printer registrar 153. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each box may represent a circuit or a number of interconnected circuits to implement the specified logical function(s).

Although the flow chart of FIG. 3 shows a specific order of execution, it is understood that the order of execution may differ from that which is depicted. For example, the order of execution of two or more boxes may be scrambled relative to the order shown. Also, two or more boxes shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the flow chart of FIG. 3 is relatively self-explanatory and is understood by those with ordinary skill in the art to the extent that software and/or hardware can be created by one with ordinary skill in the art to carry out the various logical functions as described herein.

Also, where the printer registrar 153 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the printer registrar 153 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A printer configuration method, comprising:
   receiving an email print message addressed to a network alias, the network alias being associated with an automated print agent employed for performing an email print;
   identifying a printer specified in the email print message;
   determining if the automated print agent is configured for printing to the printer; and
   automatically configuring the automated print agent to print to the printer upon a determination that the automated print agent is not configured to print to the printer.

2. The printer configuration method of claim 1, further comprising associating a domain name with the automated print agent, wherein the network alias includes the domain name.

3. The printer configuration method of claim 1, wherein the step of determining if the automated print agent is configured for printing to the printer further comprises:
   obtaining a printer network identifier associated with the printer from the email print message; and
   determining if the printer network identifier is listed in a printer directory associated with the automated print agent.

4. The printer configuration method of claim 3, wherein the step of obtaining the printer network identifier associated with the printer from the email print message further comprises obtaining the printer network identifier from the network alias.

5. The printer configuration method of claim 1, wherein the step of automatically configuring the automated print agent to print to the printer upon the determination that the automated print agent is not configured to print to the printer further comprises determining whether the printer is listed in a network resources database associated with a network that includes the printer.

6. The printer configuration method of claim 5, wherein the step of determining whether the printer is listed in the network resources database further comprises:
   obtaining a printer network identifier associated with the printer from the email print message; and
   determining if the printer network identifier is listed in the network resource database.

7. The printer configuration method of claim 6, wherein the step of obtaining the printer network identifier associated with the printer from the email print message further comprises obtaining the printer network identifier associated with the printer from the network alias.

8. The printer configuration method of claim 1, wherein the step of automatically configuring the automated print agent to print to the printer upon the determination that the automated print agent is not configured to print to the printer further comprises registering the printer in a printer directory associated with the automated print agent.

9. The printer configuration method of claim 8, wherein the step of registering the printer in the printer directory associated with the automated print agent further comprises:
   identifying a printer driver associated with the printer; and
   recording a name of the printer driver in the printer directory.

10. The printer configuration method of claim 8, wherein the step of registering the printer in the printer directory associated with the automated print agent further comprises:

identifying a print server associated with the printer; and recording a name of the print server in the printer directory.

11. A program embodied in a computer readable medium for printer configuration, comprising:

code that identifies a printer designated in an email print message addressed to a network alias, the network alias being associated with an automated print agent employed for performing an email print;

code that determines if the automated print agent is configured for printing to the printer; and code that automatically configures the automated print agent to print to the printer upon a determination that the automated print agent is not configured to print to the printer.

12. The program embodied in a computer readable medium of claim 11, further comprising a domain name associated with the automated print agent, the network alias including the domain name.

13. The program embodied in a computer readable medium of claim 11, wherein the code that determines if the automated print agent is configured for printing to the printer, further comprises:

code to obtain a printer network identifier associated with the printer from the email print message; and code to determine if the printer network identifier is listed in a printer directory associated with the automated print agent.

14. The program embodied in a computer readable medium of claim 13, wherein the code to obtain the printer network identifier associated with the printer from the email print message further comprises code that obtains the printer network identifier from the network alias.

15. The program embodied in a computer readable medium of claim 11, wherein the code that automatically configures the automated print agent to print to the printer upon a determination that the automated print agent is not configured to print to the printer further comprises code that determines whether the printer is listed in a network resources database associated with a network that includes the printer.

16. The printer configuration method of claim 15, wherein code that determines whether the printer is listed in the network resources database further comprises:

code that obtains a printer network identifier associated with the printer from the email print message; and code that determines if the printer network identifier is listed in the network resource database associated with the network.

17. The printer configuration method of claim 16, wherein the code that obtains the printer network identifier associated with the printer from the email print message further comprises code that obtains the printer network identifier associated with the printer from the network alias.

18. The program embodied in a computer readable medium of claim 11, wherein the code that automatically configures the automated print agent to print to the printer upon a determination that the automated print agent is not configured to print to the printer further comprises code that registers the printer in a printer directory associated with the automated print agent.

19. The program embodied in a computer readable medium of claim 18, wherein the code that registers the printer in the printer directory associated with the automated print agent further comprises:

code that identifies a printer driver associated with the printer; and code that records a name of the printer driver in the printer directory.

20. The program embodied in a computer readable medium of claim 18, wherein the code that registers the printer in the printer directory associated with the automated print agent further comprises:

code that identifies a print server associated with the printer; and code that records a name of the print server in the printer directory.

21. A system for printer configuration, comprising:

means for identifying a printer designated in an email print message addressed to a network alias, the network alias being associated with an automated print agent employed for performing an email print;

means for determining if the automated print agent is configured for printing to the printer; and means for automatically configuring the automated print agent to print to the printer upon a determination that the automated print agent is not configured to print to the printer.

22. The system of claim 21, further comprising a domain name associated with the automated print agent, the network alias including the domain name.

23. The system of claim 21, wherein the means for determining if the automated print agent is configured for printing to the printer, further comprises:

means for obtaining a printer network identifier associated with the printer from the email print message; and means for determining if the printer network identifier is listed in a printer directory associated with the automated print agent.

24. The system of claim 21, wherein the means for automatically configuring the printer in the email print system upon the determination that the printer is not configured in the email print system further comprises means for determining whether the printer is listed in a network resources database associated with a network that includes the printer.

25. The system of claim 21, wherein the means for automatically configuring the automated print agent to print to the printer upon a determination that the automated print agent is not configured to print to the printer further comprises means for registering the printer in a printer directory associated with the automated print agent.

* * * * *